United States Patent [19]
Oeming et al.

[11] 3,757,615
[45] Sept. 11, 1973

[54] SINGLE SPINDLE CRANKSHAFT MACHINE

[75] Inventors: Joseph A. Oeming; Allen J. Heffron, both of Saginaw; Arthur L. Estry, Jackson, all of Mich.

[73] Assignees: C. M. Systems Incorporated, Saginaw; Crankshaft Machine Company, Jackson, both of Mich.

[22] Filed: Aug. 9, 1971

[21] Appl. No.: 170,100

[52] U.S. Cl. .......................... 82/9 R, 82/4 B, 82/25
[51] Int. Cl. ....... B23b 5/18, B23b 5/04, B23b 21/00
[58] Field of Search ........................ 82/25, 4 B, 9 R

[56] References Cited
UNITED STATES PATENTS

| | | | |
|---|---|---|---|
| 2,421,147 | 5/1947 | Groene | 82/9 |
| 2,269,368 | 1/1942 | Groene et al. | 82/9 |
| 2,155,857 | 4/1939 | Dreveroff | 82/9 |

*Primary Examiner*—Harrison L. Hinson
*Attorney*—Townsend F. Beaman et al.

[57] ABSTRACT

A single spindle machine for machining crankshaft pins wherein high accuracy and excellent finishes are achieved. The machine includes a base wherein the headstock and tailstock spindles are fixedly mounted thereon, and a slide mounted on the base movable toward and away from the spindles' axis mounts an electric drive motor, a master crankshaft for tool positioning, and the tools, wherein the tools may be moved relative to the crankshaft being machined. Bidirectional gearing interconnects the headstock and tailstock spindles to a primary power input gear wherein feedback reaction forces occurring during machining produce a biasing action upon the drive gearing system eliminating play in the power train.

8 Claims, 7 Drawing Figures

INVENTORS
JOSEPH A. DEMING
ALLEN J. HEFFRON
ARTHUR L. ESTRY

INVENTORS
JOSEPH A. DEMING
ALLEN J. HEFFRON
ARTHUR L. ESTRY
BY Beaman & Beaman
ATTORNEY INVENTORS
JOSEPH A. OEMING
ALLEN J. HEFFRON
ARTHUR L. ESTEY
BY Beaman & Beaman
ATTORNEY

3,757,615

SINGLE SPINDLE CRANKSHAFT MACHINE

BACKGROUND OF THE INVENTION

The invention pertains to the art of single spindle crankshaft machines utilizing primary and secondary master crankshafts for positioning the tools relative to the crankshaft pins to be machined, both headstock and tailstock spindles being rotated under power and interconnected for rotation from a common power source.

The machining of crankshaft pins wherein the forged crankshaft blank is machined prior to finish grinding by a turning operation requires the removal of significant amounts of metal from a location on the crankshaft eccentrically related to its axis of rotation. Accordingly, complicated crankshaft pin following means are employed in crankshaft machines to produce the desired tool movement as the crankshaft rotates on its axis during machining, and the crankshaft pins being machined orbit about the crankshaft axis of rotation. The most common manner to position the crankshaft machining tools, such as turning tools, is to employ master crankshafts connected to the tools wherein an orbital motion may be imparted to the tools by the master crankshaft, or crankshafts, corresponding to the orbital motion produced by the crankshaft pin to be machined.

The orbital motion of the machining tools must be related to the rotation of the crankshaft to be machined and drive mechanisms interconnect the master crankshaft, or crankshafts, with the spindles supporting the workpiece. A preferable arrangement is to rotate both the headstock and tailstock spindles under power, wherein the spindles rotate at equal speeds and "twisting" of the workpiece crankshaft due to torsion forces about its axis of rotation during machining is minimized.

In single spindle crankshaft machines the power train connecting the power source, such as an electric motor, to the master crankshaft and headstock and tailstock spindles requires that power be transmitted through several right angle gear sets. In previous single spindle crankshaft machines such right angle power transmission has been accomplished with the utilization of worm gear and worm wheel sets whereby these sets produce both a speed reduction and a right angle transmission of torque.

During the machining of a crankshaft pin the combination of forces imposed upon the crankshaft being machined and forces exerted on the drive crankshaft produce fluctuating forces creating chatter and undesirable tool movement resulting in rough finishes and excessive wear upon the machine components. As the crankshaft pin being machined orbits about the associated crankshaft axis, a reaction force or torque is imposed upon the machined crankshaft opposite that being produced by the power source to produce crankshaft rotation. This reaction force at the tool is less than the torque force imposed upon the machined crankshaft, but forces are also occurring at the tool at right angles to this reaction force which are imposed upon the master crankshaft. The master crankshaft is powered from the same power source rotating the crankshaft workpiece, and during certain portions of the master crankshaft rotation the forces imposed upon the master crankshaft by the tool are added to the reaction forces at the tool imposing a torque upon the workpiece, and the sum of these forces is often capable of momentarily imposing a torque on the power train greater than that imposed by the power source. Thus, in effect, reverse forces are momentarily imposed upon the machine gearing system causing the meshing teeth of the gear system to resist such reverse forces and reversing the direction of force being transmitted by the gearing. Such a momentary reversal of forces imposed upon the gearing system will cause an instantaneous hesitation in the machine operation due to the existence of tolerances in the gear teeth producing "play" in the power train. Thus, unless the teeth of the gear system are perfectly matching such play will be present, and once a machine has been operating for any length of time gear tooth wear will produce such play which increasingly becomes greater during operation of the machine.

The "play" and problems caused by such inherent problems in a gearing power train system may be partially overcome by very accurately machining the gear teeth and providing adjustment means for periodically compensating for gear wear. However, such adjustment and compensating means require constant attention and suitable apparatus for overcoming this problem in a single spindle crankshaft machine has not heretofore been available. In crankshaft machines capable of machining pairs of crankshaft spindles it is possible, to some extent, to balance and compensate for the forces mentioned above which produce "power reversal" and gear play, but multiple spindle crankshaft machines are considerably more expensive than single spindle machines, and such machines are impractical when machining large and special design crankshafts.

SUMMARY OF THE INVENTION

It is a basic object of the invention to provide a single spindle crankshaft machine which is capable of machining a single crankshaft with a minimum of vibration and undesirable tool chatter and movement. The machine is of a highly rigid construction and the power train connecting the headstock and tailstock spindles, and the master crankshafts, to the power source is such that gear wear does not adversely affect the operation of the tools permitting more accurate and faster machining operations than heretofore achieved with this type of machine tool.

In the practice of the invention the crankshaft machine includes a headstock and a tailstock mounted upon a base. The axes of rotation of the headstock and tailstock spindles are coincident and the usual chucks and steady rests are associated with the spindles and base for mounting the crankshaft to be machined between the spindles for rotation thereby. A slide is mounted upon the base for movement toward and away from the headstock and tailstock spindles and this slide mounts the electric motor power source, the primary master crankshaft and the secondary master crankshaft, the crankshaft machining tools and that portion of the power train directly associated with the electric motor and the primary master crankshaft. Power transmission means extend from the slide mounted power train structure to the headstock and tailstock, and the primary master crankshaft serves as a component in the power train from the electric motor to one of the stock spindles, in the disclosed embodiment, the tailstock.

In order that the reaction forces produced at the crankshaft pins being machined produced by the cutting tools might be fed back through the power train, bidirectional gearing is employed in the power train, and such bidirectional gearing consists of bevel gears used at each instance where the power train employs a right angle drive. Thus, the bidirectional gearing of the invention distinguishes over the unidirectional right angle drive, such as produced by worm gear and worm wheel sets, utilized in conventional single spindle crankshaft machines.

Movement of the tools toward the workpiece is accomplished by translation of the slide, and such movement is preferably achieved through an expansible chamber motor capable of being accurately regulated wherein the rate of tool feed into the workpiece may be very closely controlled.

The power train used in the practice of the invention includes a worm gear directly rotated by the slide mounted electric motor. This worm gear meshes with a worm wheel rotating about an axis parallel to the axis of rotation of the crankshaft to be machined, and the worm wheel axis coincides with the axis of rotation of the primary master crankshaft. Two sets of bevel gears are utilized to connect the worm wheel with the headstock spindle, a telescoping spline set being interposed between the gear sets to permit power transmission during movement of the slide. The worm wheel also rotates the primary crankshaft, as aforementioned, and the primary master crankshaft drives two bevel gear sets which transmit power to the machine tailstock spindle, and a second telescoping power transmission is interposed between the tailstock gear sets to permit power transfer during slide adjustment. In this manner the headstock and tailstock spindles are interconnected through four bevel gear sets, and the worm wheel is an integral part of the power train interconnecting the headstock and tailstock spindles. By using the type of power train disclosed in the invention the feedback of reaction forces to the worm wheel insures that the worm and worm wheel teeth engagement will always be on the same side of the teeth thereby eliminating inaccuracies and vibrations due to reverse forces causing reverse meshing of the gear teeth. Likewise, the teeth of the bevel gear sets will always be driving in a common direction due to the biasing force being imposed on the gears opposite to the power direction of gear teeth wear, gear teeth engagement between meshing gear sets will be constant and consistent and the reversal forces imposed upon the power train are so distributed as not to overcome the primary forces produced by the electric motor power source.

The objects of the invention to provide a single spindle crankshaft machine capable of superior operation are readily achieved in a machine in accord with the inventive concepts, and the construction of such a machine may be accomplished with conventional equipment.

BRIEF DESCRIPTION OF THE DRAWINGS

The aforementioned objects and advantages of the invention will be appreciated from the following description and accompanying drawings wherein.

DESCRIPTION OF THE DISCLOSED EMBODIMENT

Figure 2:
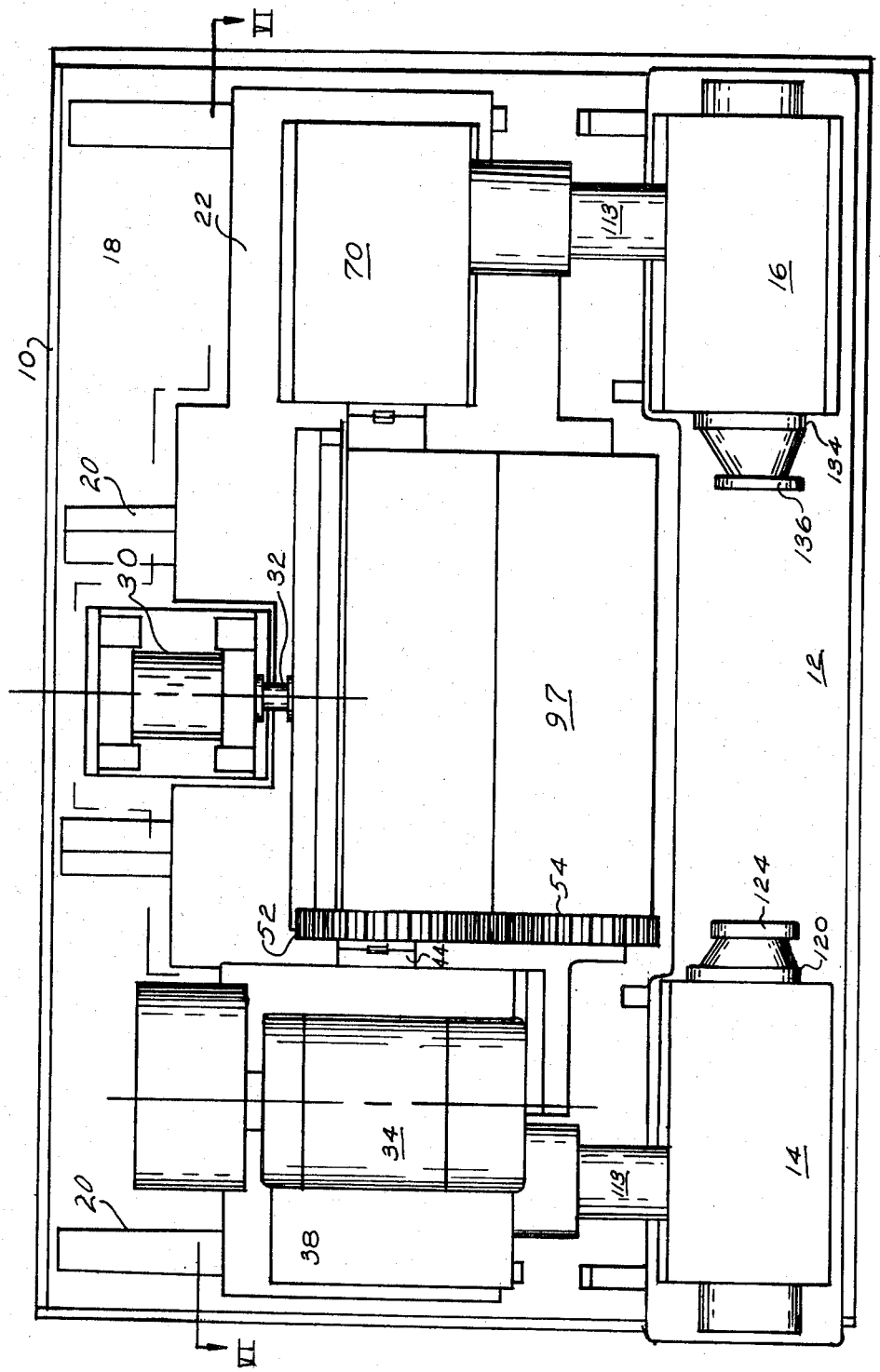
FIG. 2 is a top plan view of the single spindle crankshaft machine in accord with the novel aspects disclosed.
Figure 3:
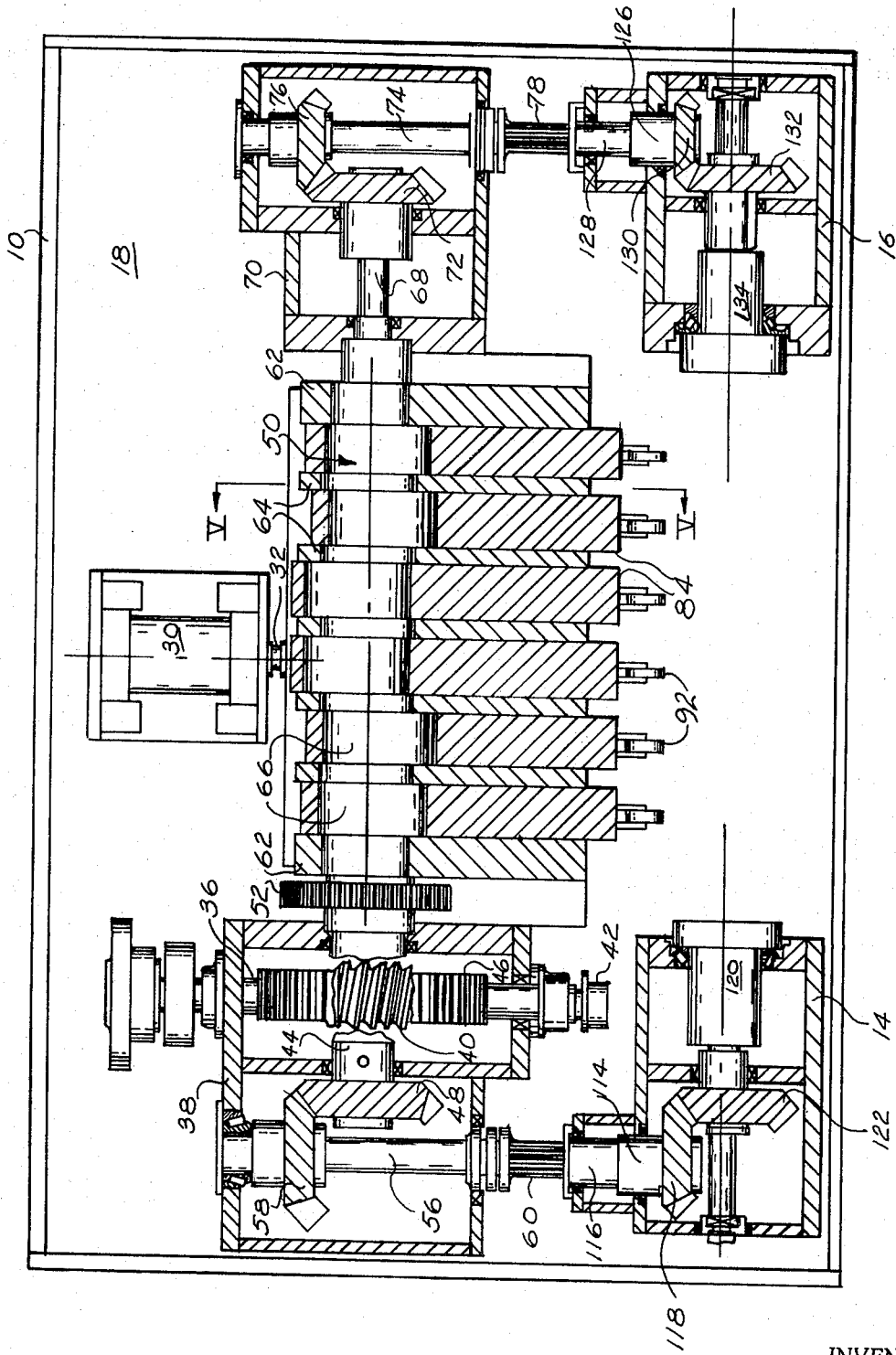
FIG. 3 is a plan sectional view taken through the crankshaft machine power train and primary master crankshaft as along Section III—III of FIG. 1.
Figure 4:
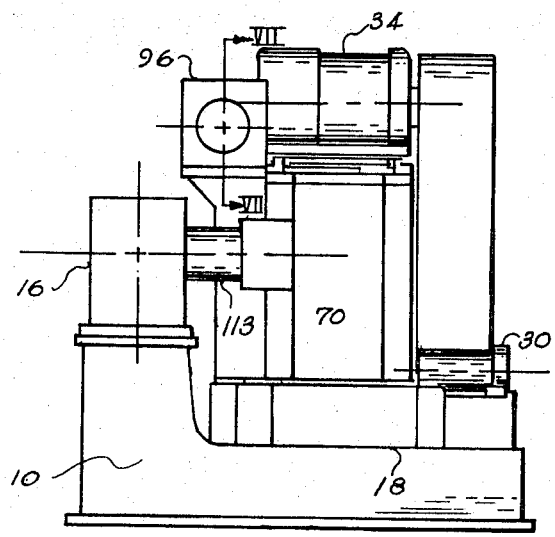
FIG. 4 is an end elevational view of the machine as taken from the right of FIG. 1.

A single spindle crankshaft machine in accord with the invention includes a massive cast base 10 of a rectangular configuration as will be appreciated from FIGS. 2 and 3. The base 10 includes an elevated front portion upon which mounting surface plate 12 is affixed, and serves as the support for the headstock spindle housing 14 and the tailstock spindle housing 16. The headstock and tailstock spindle housings are fixedly mounted on the plate 12 wherein these housings are fixed with respect to the base. As will be appreciated from FIG. 4, the front portion of the base is elevated with respect to the rear base portion 18, FIG. 4, and the base rear portion includes four guideways 20 bolted thereto and disposed in a direction perpendicular to the axis of the headstock and tailstock spindles, and the axis of rotation of the crankshaft being machined.

A large slide 22 is mounted upon the guideways 20 for movement toward and away from the headstock and tailstock housings. The slide 22 is of a very heavy and massive construction and includes rectangular ways 24 which rest upon the ways 20. In the central region of the base L-shaped guides 26 are mounted upon the base, and guidways 28 mounted upon the slide cooperate with the guideways 26 whereby the slide is firmly and accurately mounted for movement upon the base 10 and lateral and vertical movement is prevented by the guideway system.

Movement of the slide 22 is produced by an expansible chamber motor 30 mounted upon an elevated section of the rear base portion which includes a piston rod 32 connected to the slide. Controls, not shown, which may include automatic feed flow controlled devices, regulate the flow of pressurized hydraulic fluid to the expansible motor to extend and retract the piston and thereby move the slide 22 toward the front of the base, or retract the slide therefrom.

The power source for the crankshaft machine consists of an electric motor 34 mounted upon the slide, and the electric motor is connected to a shaft 36 journaled in gear housing 38 mounted upon the slide. The shaft 36 mounts a worm gear 40, FIG. 3, and the end 42 of the shaft may be connected to an inching motor, not shown, for slowly rotating the shaft to produce slow cycling of the machine for setup and adjustment purposes.

Figure 1:
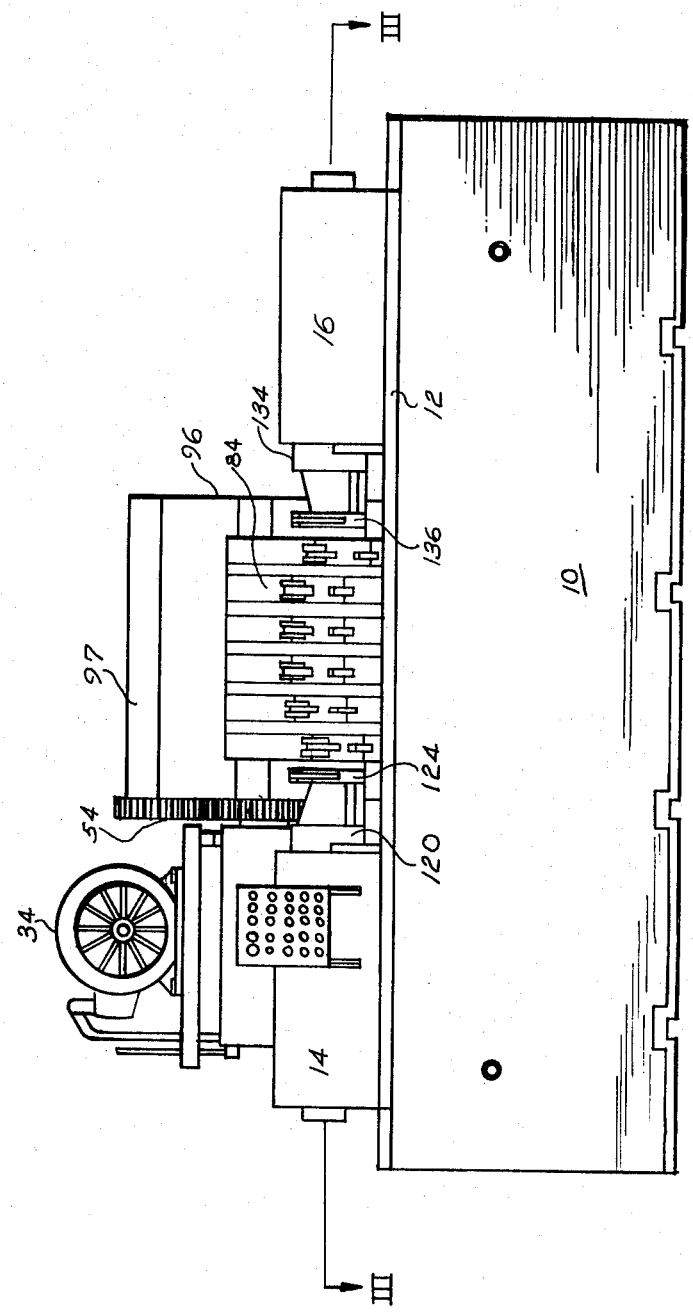
FIG. 1 is a front elevational view of a single spindle crankshaft machine constructed in accord with the invention.

A shaft 44 is also rotatably mounted upon antifriction bearings in the housing 38 and serves as a support for the worm wheel 46 which meshes with the worm gear 40. The shaft 44 includes a bevel gear 48, FIG. 3, at one end, and is connected to the primary master crankshaft 50 at the other end. Also, a spur gear 52 is mounted upon the shaft 44 adjacent the primary master crankshaft for engagement with a spur gear set 54, FIG. 1, which serves as the drive means for the secondary master crankshaft, as will be described later.

The housing 38 also includes a shaft 56 disposed at right angles to the shaft 44 mounted in antifriction bearings and having a bevel gear 58 attached thereto and meshed with the gear 48. The forward end of the shaft 56 includes a spline 60 for producing a driving connection with the headstock gear set as later set forth.

The primary master crankshaft 50 is supported in bearings 64 defined upon a plurality of vertically extending plates 62 mounted upon the slide. The crankshaft also includes crank pins 66, six in number in the disclosed embodiment, of a large diameter, such as 10 or 12 inches, located between the crankshaft bearings and eccentrically disposed with respect to crankshaft axis of rotation. The crank pins 66 may be of the adjustable type wherein the degree of eccentricity may be varied. The right end of the master crankshaft 50 is connected to a shaft 68 journaled within gear set housing 70 upon which the bevel gear 72 is mounted. The housing 70 is fixed upon slide 22 and also rotatably supports shaft 74 within antifriction bearings, upon which bevel gear 76 is mounted in mesh with gear 72. Shaft 74 includes a spline 78 for establishing an adjustable driving connection with the tailstock spindles as will be described.

Figure 5:
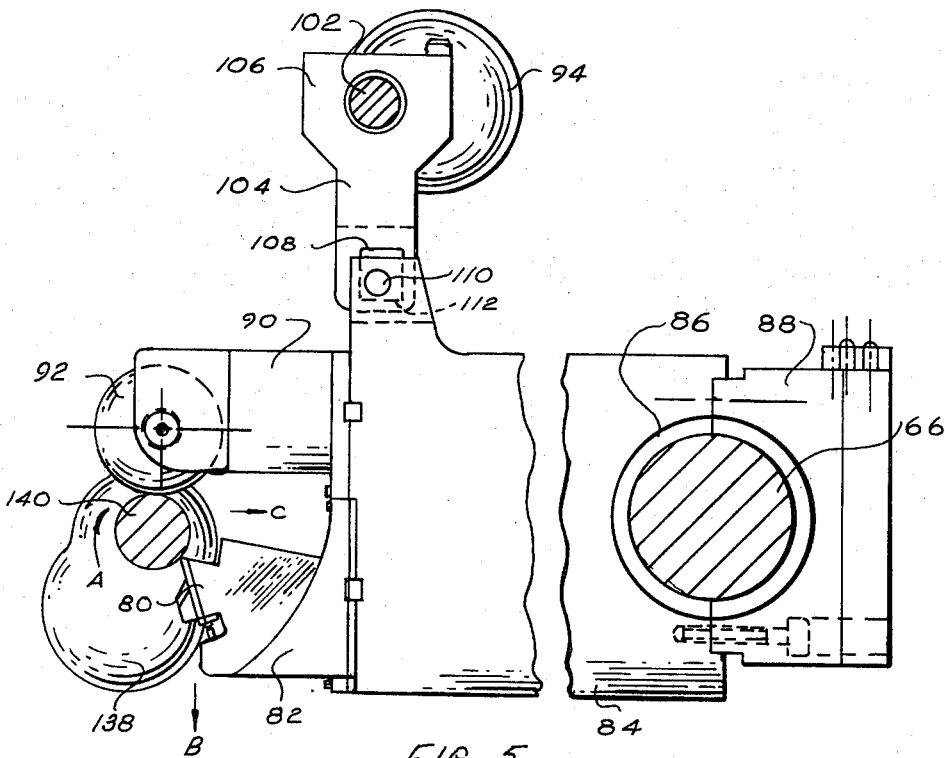
FIG. 5 is an elevational sectional view of a tool plate as taken along Section V—V of FIG. 3.
Figure 6:
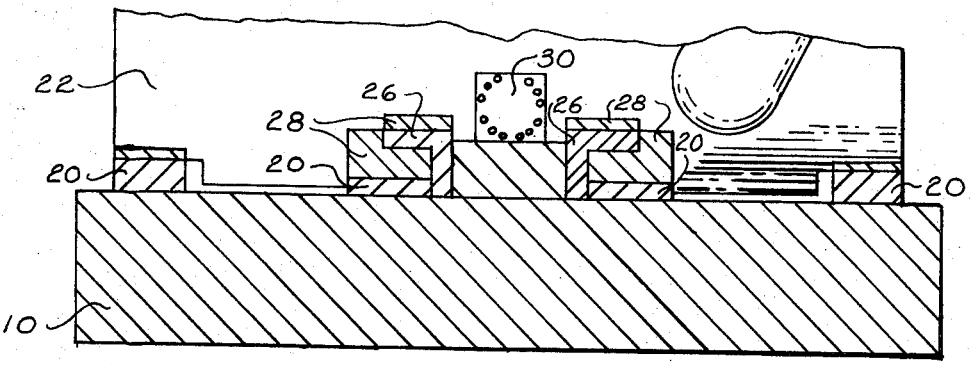
FIG. 6 is an elevational, detail sectional view taken through the base illustrating the guide structure as taken along Section VI—VI of FIG. 2.

The cutting tools 80, FIG. 5, consist of turning tools mounted upon tool holders 82. The tool holders 82 are supported upon the slide 22 by means of tool plates 84 disposed between and guided between the bearing plate 62. As appreciated from FIG. 5, the plates 84 include sleeves 86 for establishing a bearing relationship with the primary master crankshaft pins 66, and caps 88 bolted to the plates maintain the tool plates connected to the associated master crankshaft pin.

The tool plates 84 also each include roller supports 90 extending from the forward end thereof for rotatably mounting a roller 92, FIG. 5, adapted to rest upon the workpiece crankshaft pin during the final stages of turning, in the known manner.

Figure 7:
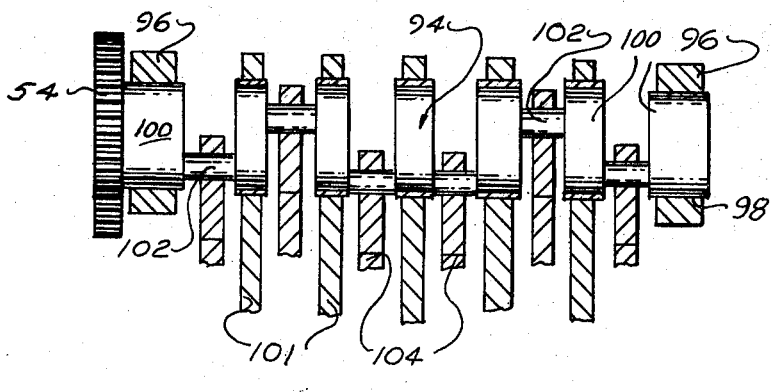
FIG. 7 is a detail elevational sectional view taken through the secondary master crankshaft along Section VII—VII of FIG. 4.

Vertical orientation of the tool plates 84 is achieved by the secondary master crankshaft 94, FIG. 7, rotatably mounted upon the slide 22 on end plates 96 disposed above the tool plates 84. A cover 97 is disposed over crankshaft 94. The secondary master crankshaft is journaled within bearings 98 mounted in the end plates 96, and is rotatably driven by the spur gear set 54, FIG. 1, meshing with the spur gear 52 mounted upon the shaft 44. The crankshaft 94 includes a plurality of bearings 100 mounted within bearing support plates 101 affixed to the slide, and the crankshaft pins 102 are each connected with a tool plate 84 by a connecting rod assembly 104, FIG. 5. The connecting rod 104 includes a bolted on cap 106 and a sleeve bearing at its upper end. The lower end of the connecting rod includes a rectangular opening 108 through which the tool plate mounted pin 110 extends, and as the vertical dimension of the opening 108 is greater than the diameter of the pin 110 a lost motion connection between the tool plates and connecting rods of the secondary master crankshaft exist. Under usual conditions, the pin will be resting upon the opening lower surface 112, and the crank pins will be supporting the weight of the tool plates adjacent the tolls 80. It is only during the final stages of machining, when the rollers 92 engage the pins of the crankshaft being machined, that the tool plates are supported by the rollers 92, and guided thereby.

The telescoping splines and spline socket transmission interconnections are enclosed within telescoping housings 113 in order to protect the splines from dirt and chips. These housings are not illustrated in FIG. 3 in order to better appreciate the transmission features.

The headstock housing 14 rotatably supports a shaft 114 having an internally splined socket portion 116 for receiving the spline 60 of the shaft 56. In this manner the rotative torque of shaft 56 may be transferred to shaft 114 as the slide 22 is moved toward and away from the headstock. The shaft 114 includes a bevel gear 118 located within the housing 14.

The headstock housing 14 also includes the headstock spindle 120 rotatably mounted therein on antifriction bearings, and the bevel gear 122 affixed upon the headstock spindle meshes with the gear 118. The headstock spindle 120 includes a conventional chuck 124 for clamping the crankshaft workpiece in the well known manner.

The tailstock drive structure is similar to that of the headstock structure, and includes a shaft 126 rotatably mounted within the housing 16 having a spline socket 128 for receiving the spline 78. The bevel gear 130 mounted upon shaft 126 meshes with the bevel gear 132 mounted upon the rotatably supported tailstock spindle 134. The tailstock spindle also includes a conventional chuck 136 wherein the other end of the crankshaft being machined may be clamped thereby and thus both ends of the crankshaft being machined are driven by the worm wheel 46.

Of course, accessory equipment commonly employed with crankshaft machines such as steady rests, chip removers, hydraulic fluid pumps, and the necessary electrical controls are required by the machine in accord with the invention. However, as this equipment is of conventional nature, and is used in the conventional manner with the apparatus of the invention, it is not illustrated in the attached drawings, and forms no part of the instant invention. Further, in order to best illustrate the machine the workpiece crankshaft is not illustrated except in FIG. 5.

In operation, a crankshaft workpiece 138, FIG. 5, is chucked within the headstock and tailstock chucks 124 and 136. The usual steady rests, not shown, mounted upon the bed plate 12 for association with the crankshaft bearings are connected to the workpiece in order to support the crankshaft during machining of its pins 140. The motor 30 is energized such that the piston rod 32 is retracted, and the slide 22 will be removed its greatest distance from the axis of the headstock and tailstock spindles, which constitutes the axis of the crankshaft workpiece. The electric motor 34 is energized and the rotation thereof rotates the shaft 36 and the worm 40 to rotate the worm wheel 46.

Rotation of the worm wheel 46 rotates the primary master crankshaft 50 due to its direct connection therewith, rotates the secondary master crankshaft 94 through the spur gear drive set 54, rotates the headstock spindle 120 through the bevel gear set 48 and 58, and the bevel gear sets 118 and 122, due to the splined interconnection therebetween. Rotation of the master crankshaft 50 also rotates the shaft 68, which rotates the bevel gear sets 72 and 76, which causes a driving of the tailstock spindle through the bevel gears 130 and 132.

The expansible motor 30 is pressurized to slowly move the slide 22, and the structure mounted thereon, toward the axis of rotation of the crankshaft 138, and during this phase the tools 80 will be oribiting orbiting a circular manner under the influence of the primary master crankshaft 50, and the secondary master crankshaft 94. At this time the pin 110 will be resting upon the opening surface 112, wherein the secondary crankshaft 94 produces the vertical movement of the turning tools, while the primary crankshaft 50 produces the horizontal displacement. Movement of the slide 22 continues toward the crankshaft workpiece and upon the tools 80 engaging the crank cheeks and pins 140 machining thereof will occur. Extension of the piston rod 32 is adjusted at a rate proportional to the desired tool feed rate and due to the orbiting motion of the tools, cutting of the crank pin occurs throughout the complete rotation of the crankshaft 138. During the later stages of machining the roller 92 will engage the previously machined surface of the crank pin 140 and the weight of the tool plate 84 adjacent the tool 80 is then supported by the roller and the crankshaft 138, and the pin 110 is lifted from the connecting rod opening surface 112 and lost motion occurs between the piston rod and the pin. Once the turning operation is completed the expansible motor 30 is energized to retract the piston rod, and remove the slide 22 from the crankshaft 138. The motor 30 may then be deenergized such that the headstock and tailstock spindles cease rotation to permit unchucking of the machined workpiece crankshaft and the rechucking of the next crankshaft to be machined.

During the machining of the crank pins 140, the crankshaft 138 is rotating in the direction indicated by the arrow A, FIG. 5. The forces imposed upon the cutting tool 80 are downwardly, as indicated by arrow B, and rearwardly, as indicated by arrow C. The reaction to forces in the direction B tends to impose a torque on the crankshaft 138 opposite to that being produced by the motor 34 and the drive train rotating the headstock and tailstock spindles. Due to the presence of bevel gears in the power train this reaction force may be transmitted "back" to the worm wheel 46 through both the headstock and tailstock spindles, and the bevel gears associated therewith.

The cutting forces in the direction C are imposed upon the crank pins 66 of the primary master crankshaft 50. As will be appreciated, the existence of the force C on the crank pins 66 causes opposite reaction forces upon the primary master crankshaft depending upon the relationship of the crank pin to its crankshaft axis of rotation. Such reaction forces are also imposed upon the worm wheel 46, due to the direct interconnection between the primary master crankshaft 50 and the worm wheel. The reaction forces imposed upon the headstock and tailstock spindles due to the forces in the direction B, and the reaction forces imposed upon the primary master crankshaft due to the forces in the direction C are transmitted to the worm wheel 46, but the sum of these reaction forces is less than the torque forces produced by the electric motor 34 during machining. However, these "feed back" reaction forces constitute a "biasing" force upon the gearing of the power train which insures that the same side of the gear teeth of the meshing bevel gear sets, and the teeth of the worm and worm wheel, engage at all times, and thus any play, wear or tolerances that may exist in the gear teeth do not affect the operation of the machine during machining. Without the presence of the bidirectional torque transmitting characteristics of the bevel gear sets such as "biasing" feedback of the reaction forces during cutting would not be achievable, and tolerances or wear existing in the gear sets, particularly with respect to the worm and worm wheel, would cause chattering and a reversal of forces between meshing gears, and result in producing adverse cutting characteristics. Accordingly, it will be appreciated that the power train arrangement of the invention produces unusual and important advantages in a single spindle crankshaft machine.

Modifications to the inventive concept may be apparent to those skilled in the art without departing from the spirit and scope thereof.

We claim:

1. A single spindle crankshaft machine conprising, in combination, a base, coaxial headstock and tailstock spindles rotatably mounted on said base, a bevel gear mounted on each of said spindles, a bevel gear transmission interconnecting the bevel gear mounted on said headstock spindle with the bevel gear mounted on said tailstock spindle, crankshaft machining tools mounted upon said base adapted to machine a crankshaft mounted upon said spindles, said bevel gear transmission including a master drive crankshaft rotatably mounted upon said base drivingly connected to said crankshaft machining tools, said drive crankshaft forming a portion of said bevel gear transmission directly drivingly interposed in the transmission of power between said headstock and tailstock spindles wherein all torque transmitted between said spindles through said transmission is transmitted through said master drive crankshaft, and electric motor drive means drivingly connected to said bevel gear transmission.

2. In a single spindle crankshaft machine as in claim 1 wherein a worm gear is rotatably mounted upon said base, said motor being drivingly connected to said worm gear, a worm wheel rotatably mounted on said base meshing with said worm wheel, said bevel gear transmission being directly driven by said worm wheel.

3. A single spindle crankshaft machine comprising, in combination, a base, a headstock spindle rotatably mounted upon said base, a first right angle drive bevel gear set drivingly connected to said headstock spindle, a tailstock spindle rotatably mounted upon said base having an axis of rotation coincident with the axis of rotation of said headstock spindle, a second right angle drive bevel gear set drivingly connected to said tailstock spindle, a slide movably mounted on said base for movement toward and away from the axis of rotation of said spindles, first motor means mounted on said base for moving said slide, a third right angle drive bevel gear set mounted on said slide drivingly connected to said first gear set, a fourth right angle drive bevel gear set mounted on said slide drivingly connected to said second gear set, first and second relatively axially movable power transmission means transversely disposed to said spindles' axis interposed between said first and third gear sets and said second and fourth gear sets, respectively, a master crankshaft having opposite ends and rotatably mounted on said slide having an axis substantially parallel to said spindle axis, cutting tools operatively connected to said master crankshaft and mounted on said slide, second motor means rotatably drivingly connected to said master crankshaft, said third gear set drivingly connected to one end of said master crankshaft and the other crankshaft end being drivingly connected to said fourth gear set said master crankshaft constituting the sole power train connection between said third and fourth gear sets and said spindles.

4. A single spindle crankshaft machine comprising, in combination, a base, a master crankshaft, a headstock spindle and a tailstock spindle coaxially rotatably mounted upon said base adapted to hold a crankshaft to be machined chucked therebetween, an electric motor mounted upon said base, a first drive gear drivingly connected to said motor, a second drive gear meshing with said first gear, a bidirectional gear power train including said master crankshaft drivingly interconnecting said spindles to said second drive gear, and crankshaft cutting tools mounted upon said base adapted to engage the pins of the chucked crankshaft imposing a torque on said spindles in a direction opposite to and less than the torque applied to said spindles by said second gear.

5. A single spindle crankshaft machine as in claim 4 wherein said first gear comprises a worm gear and said second gear comprises a worm wheel.

6. A single spindle crankshaft machine as in claim 5 wherein said bidirectional gear power train comprises a plurality of bevel gear sets.

7. A single spindle crankshaft machine as in claim 4, a master drive crankshaft rotatably mounted on said base having an axis of rotation substantially parallel to said spindles' axis and including pins eccentrically disposed to its axis of rotation, tool supports connected to said pins and movable toward and away from said spindles' axis thereby, said tools being mounted upon said tool supports, said master drive crankshaft being operatively connected to and driven by said second gear.

8. A single spindle crankshaft machine as in claim 7 wherein said master drive crankshaft is interposed in the power train between said second gear and one of said spindles.

* * * * *